United States Patent [19]
Fassman

[11] Patent Number: 4,767,375
[45] Date of Patent: Aug. 30, 1988

[54] TOY AUTO GARAGE

[76] Inventor: Arnold Fassman, 40 Oak St., Westport, Conn. 06880

[21] Appl. No.: 13,540

[22] Filed: Feb. 11, 1987

[51] Int. Cl.⁴ .................... A63H 17/44; G01G 3/08
[52] U.S. Cl. .................... 446/423; 446/476; 177/229
[58] Field of Search ............... 446/423, 409, 429, 430, 446/440, 476, 483; 177/229

[56] References Cited

U.S. PATENT DOCUMENTS

| | | | |
|---|---|---|---|
| 2,036,637 | 4/1936 | Kingsbury | 177/229 |
| 2,040,521 | 5/1936 | Marx | 446/423 |
| 2,776,522 | 1/1957 | Schramm et al. | 446/423 |
| 2,797,526 | 7/1957 | Milhas | 446/483 |
| 3,171,636 | 3/1965 | Barlow et al. | 177/229 |
| 3,654,728 | 4/1972 | Beny et al. | 446/423 |
| 4,260,041 | 4/1981 | Mabuchi | 446/429 |
| 4,274,225 | 6/1981 | Knauff et al. | 446/409 |
| 4,529,389 | 7/1985 | Kennedy et al. | 446/429 |

FOREIGN PATENT DOCUMENTS

| | | | |
|---|---|---|---|
| 1068166 | 10/1959 | Fed. Rep. of Germany | 446/429 |
| 1104215 | 11/1955 | France | 446/483 |
| 8601737 | 3/1986 | PCT Int'l Appl. | 446/423 |
| 684536 | 12/1952 | United Kingdom | 446/483 |
| 2060415 | 5/1981 | United Kingdom | 446/440 |

Primary Examiner—Robert A. Hafer
Assistant Examiner—Charles H. Harris
Attorney, Agent, or Firm—Edward R. Hyde

[57] ABSTRACT

A toy automobile diagnostic center in which a toy automobile is directed onto a platform where various measurements and tests are performed that simulate measurements and tests that are performed on real automobiles. The tests are performed upon the toy which is located at a single test location and include length and height measurements, weight, wheel rotation and others.

4 Claims, 5 Drawing Sheets

TOY AUTO GARAGE

BACKGROUND OF THE INVENTION

The present invention relates to a mechanical toy and, more particularly to a toy that simulates an automobile diagnostic center where various characteristics of an automobile are checked.

Children are customarily fascinated by automobiles because they regularly see adults operate them. Because operation is denied to the children, they emulate the adults in playing with toy cars and toy auxiliary equipment. A child will accompany his parent to an automobile garage where the garagemen will perform various operations on the automobile to either determine the cause of a mechanical problem or to check various functional or structural characteristics of the vehicle.

The child will observe the garage mechanic testing the adult's car and will tend to remember in a general way the various tests. The child with the toy automobile will then desire to emulate these tests in playing with his toys. The tests may take a variety of forms such as physical measurements, emissions check, weighing, tire eccentricity and others.

Accordingly, the present invention contemplates a toy automobile diagnostic center in which a child can place a toy car and perform various measurements and tests.

An object of the invention is to provide a toy car diagnostic center in which a toy automobile may be placed in a position for various simulated automobile tests which a child (or adult) can perform on the automobile.

Another object of the present invention is to provide a toy adapted to receive a toy automobile for performing various operations on the automobile that are analogous to operations performed on real automobiles at garage repair stations.

A further object of the invention is to provide a toy for a child in which he can simulate various operations on a toy automobile.

These and other objects of the invention will become apparent from the following description of the invention.

SUMMARY OF THE INVENTION

The above and other objects of the invention are accomplished by a mechanical device adapted to receive a toy automobile on which, when located in a test position, various measurements and tests may be performed.

One such test is that of front wheel rotation. With the automobile in position its from wheels are located on a roller, which a child may cause to be rotated and which in turn rotates the tires on the automobile. The rotation is indicated on a numerical counter, which the child may observe and record the reading by pencil and paper.

Another measurement is that of weighing the automobile. A spring urged platform located in the test position will raise the car against the force of the spring indicating its weight on a calibrated scale. Similarly the overall length of the car may be measured as well as the wheel base.

These and other measurements and tests are all analogous to those made on an adult car at garages.

DETAILED DESCRIPTION OF THE INVENTION

Figure 1:
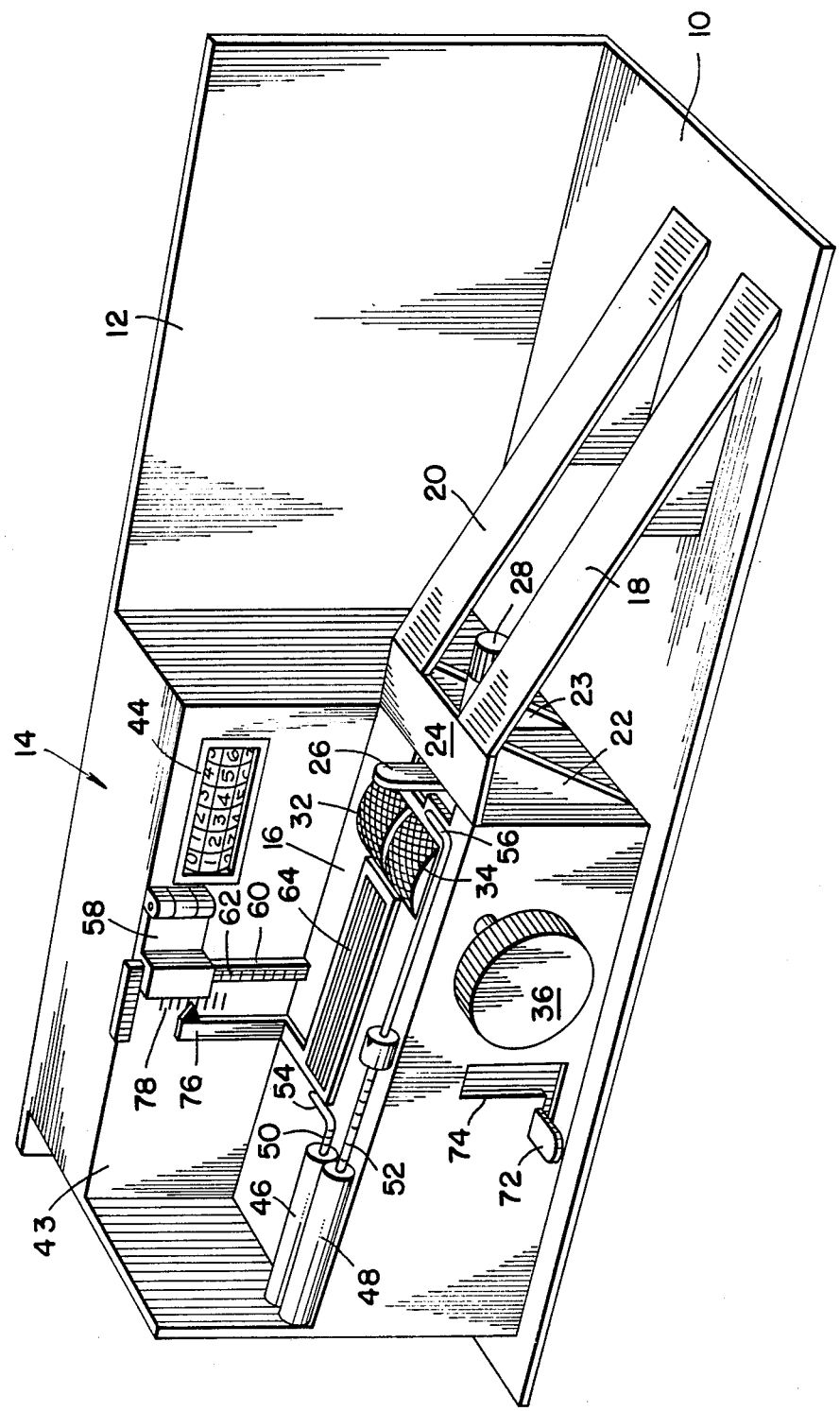
FIG. 1 is a perspective view of the miniature auto diagnostic center of the present invention.
Figure 2:
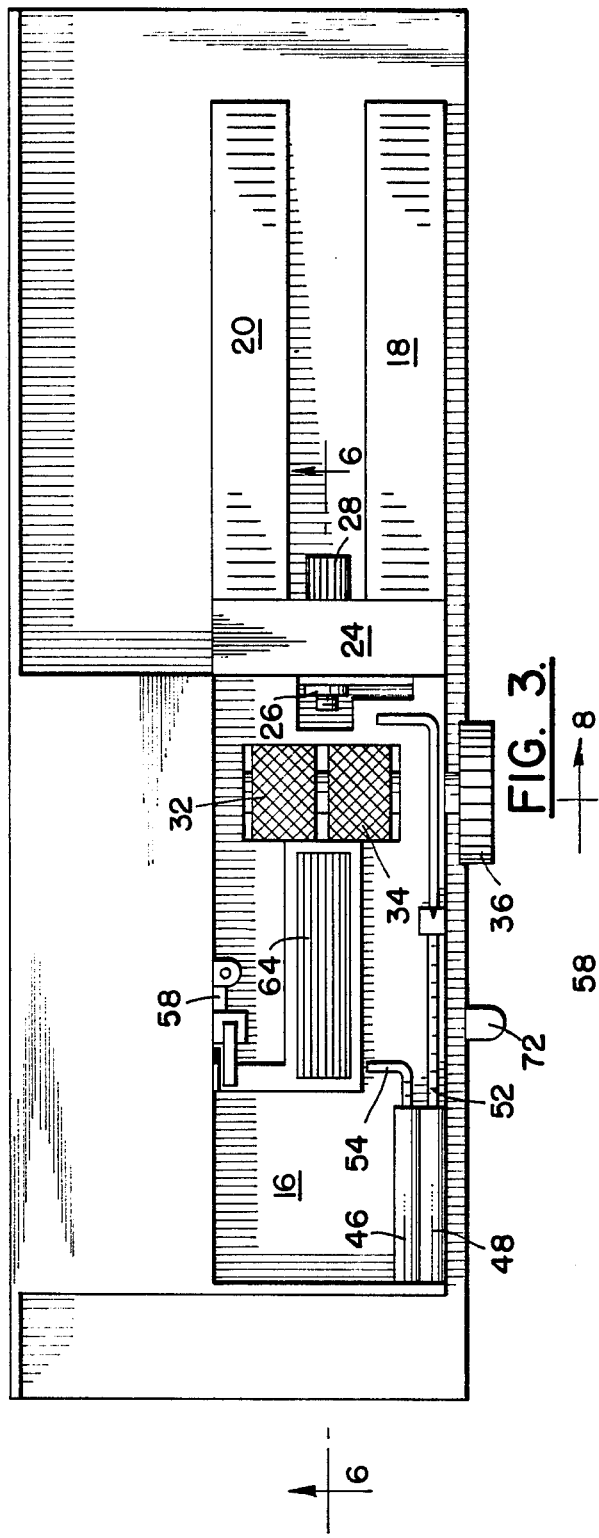
FIG. 2 is a plan view of the toy apparatus of FIG. 1.
Figure 3:
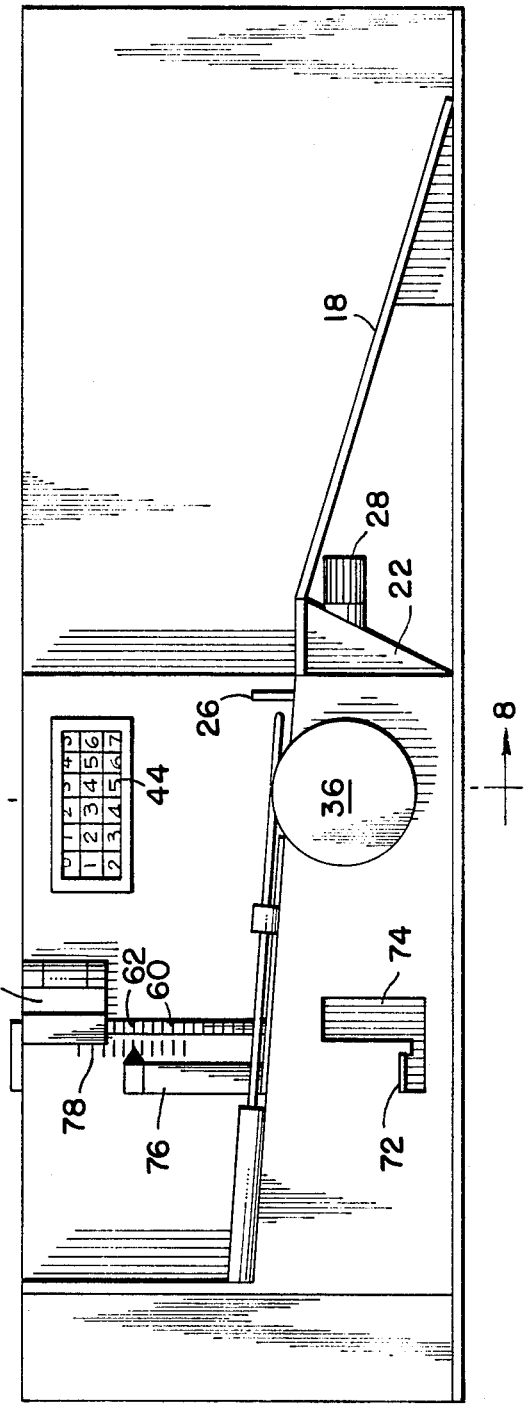
FIG. 3 is a side elevation of the toy apparatus of FIG. 1.
Figure 4:
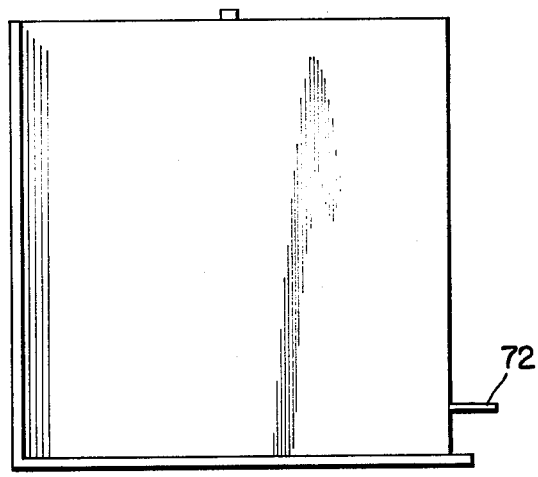
FIG. 4 is a left end view of the toy apparatus of FIG. 1.
Figure 5:
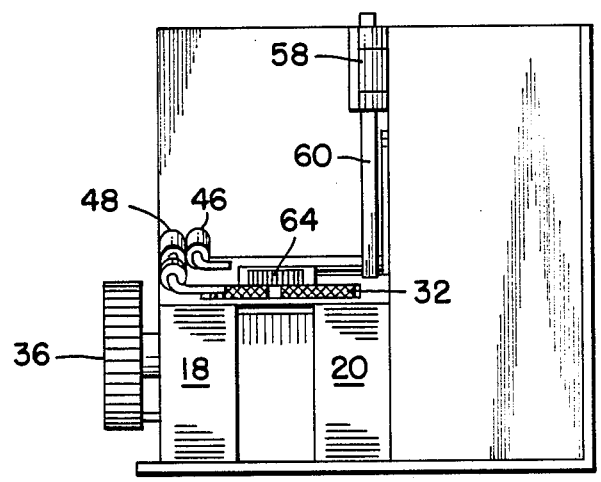
FIG. 5 is a right end view of FIG. 1.
Figure 6:
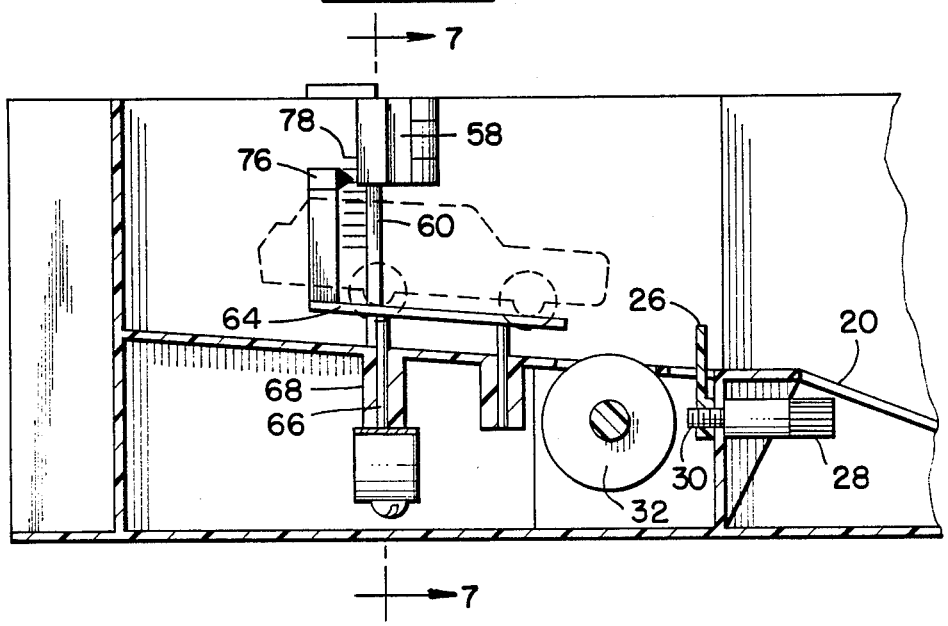
FIG. 6 is a section taken on the line 6—6 of FIG. 2 with a toy automobile in the raised position.
Figure 8:
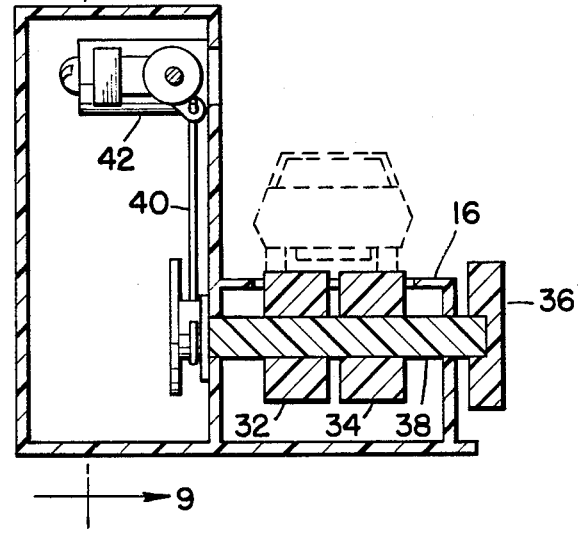
FIG. 8 is a section taken on the line 8—8 of FIG. 3.
Figure 9:
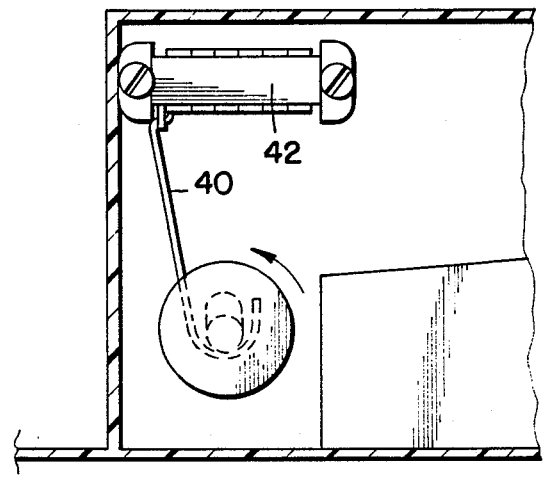
FIG. 9 is a section taken on the line 9—9 of FIG. 8.
Figure 10:
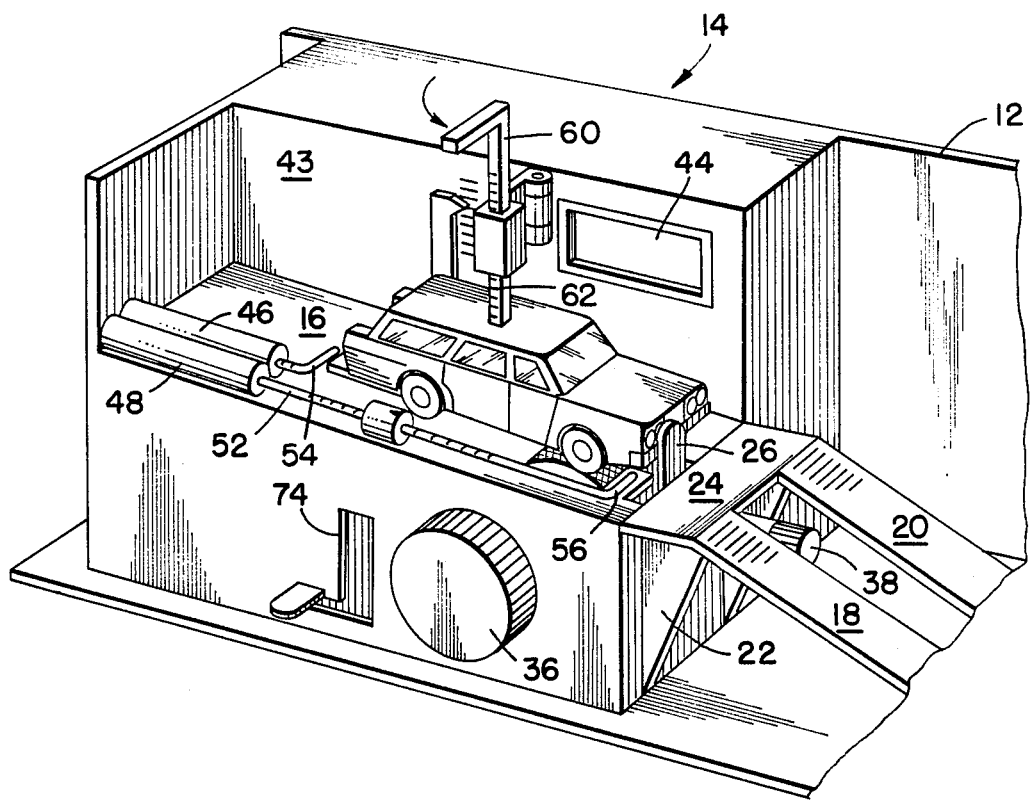
FIG. 10 is a perspective view of the toy diagnostic center with a miniature auto in position.

Referring now to the drawings and more particularly to FIG. 1, there is shown a perspective view of the toy diagnostic center of the present invention. A base member 10 and side 12 serve to support the measuring and test mechanism generally indicated by 14. The central element of the testing station is a deck 16 that serves to receive the toy automobile. A pair of ramps 18 and 20 are secured to the deck and held in place by brackets 22, 23 and apron 24. A front stop member 26 may be raised to the position shown in FIGS. 1 and 6 or retracted and lowered below the level of deck 16 by a knob 28 and threaded shaft 30. Thus the child will lower the front stop 26 and roll his toy automobile up onto the deck in position as shown in FIGS. 8 and 10. With the toy automobile in position on the deck the front stop 26 is then raised to retain the car in position. The child may then rotate a pair of rollers 32 and 34 that are in contact with the front wheels of the toy automobile as seen more clearly in FIG. 10. These rollers are made to rotate by knob 36 connected to shaft 38 which in turn mounts the rollers 32 and 34. As shown in FIGS. 8 and 9 the inner end of shaft 38 connects by a mechanical linkage 40 to a numerical counter 42 mounted to display its numerals through a window 44 as seen in FIGS. 1 and 10.

Thus as the child rotates knob 36 rollers 32 and 34 will rotate the wheels of the automobile and the number of rotations be indicated on the counter which the child can observe and conveniently record.

Provision is made for measuring the length of the wheelbase of the toy automobile when it is in place on the deck 16. For this purpose there is mounted on the deck a pair of cylinders 46 and 48 each of which receive an L shaped measuring rod 50 and 52 respectively. The measuring rods are appropriately marked or calibrated in feet and inches and are adapted to be manually slid within their respective cylinders.

With the toy automobile in place the measuring rod 50 is manually moved so that its inwardly extending end 54 contacts the rear extremity of the toy automobile as shown in FIG. 10. Similarly the measuring rod 52 is extended until its inwardly extending end 56 contacts the front of the automobile. The markings on the measuring rod 50, 52 are then visually noted by the child and the overall length of the automobile may be recorded.

The same length measuring rods 50, 52 may be used to measure the wheelbase. For this measurement the end 54 of the measuring rod 50 is brought forward to a point where it is aligned with the rear axle of the vehicle. This may be done by rotating the measuring rod 50 so that the bent over end 54 is upward and then the rod is extracted from the cylinder until its end is in line with the rear axle. Similarly the end 56 of measuring rod 52 is brought in line with the front axle. At this point the child can note the markings on the measuring rod and can note the wheelbase of the toy vehicle.

Another measurement that may be made is that of the height of the automobile. To this end there is mounted to the panel 43 a pivoting bracket 58 that receives a height measuring rod 60 that may square in cross section as shown in FIGS. 1 and 10. When the height measuring device is not in use it is pivoted to lie against panel 43 as seen in FIG. 1. Then when it is desired to measure the height of the vehicle, bracket 58 is pivoted outwardly as in FIG. 10 and the measuring rod 60 is lowered until its end just touches the roof of the toy automobile. It is seen that the rod is calibrated in linear measure as shown at 62, so that the child can visually observe the height of the toy car.

Figure 7:
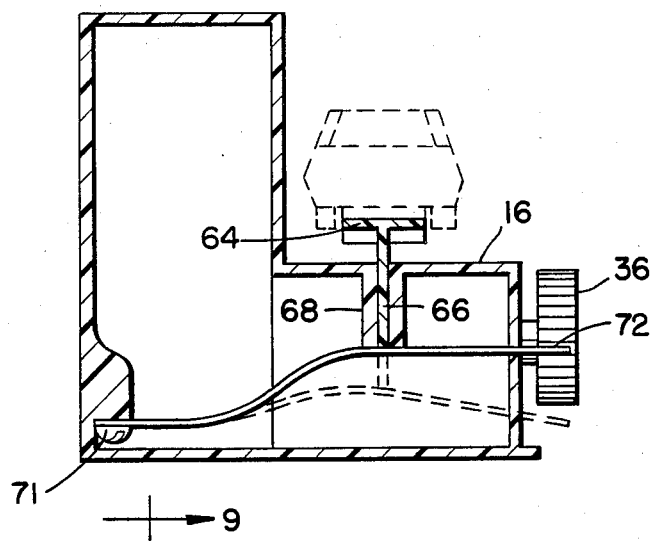
FIG. 7 is a section taken on the line 7—7 of FIG. 6.

A further measurement that can be made is that of weighing the toy vehicle and accordingly there is provided a platform scale 64 which normally rests on the deck 16. The platform 64 is supported by a post 66 that extends upwardly through a projection 68 on the underside of the deck 16 as shown more clearly in FIG. 7. The post 66 is urged upwardly by a leaf spring 73 secured at 71. The outer end of the leaf spring extends through L shaped cutout 74 as seen in FIG. 1. The outer end of the spring may by manually depressed and locked in position so that the platform 64 rests on deck 16. Then when it is desired to weigh the automobile the outer end of the spring is moved to the right as shown in FIG. 1 to permit the spring to urge post 66 and platform 64 upwardly which raises the automobile against the force of the spring. A measuring pointer 76 extending upwardly from platform 64 indicates the weight of the automobile on a calibrated scale 78 on panel 43. Therefore it is seen that the automobile weight can be conveniently measured by the child and when the measurement is complete the outer end of the spring 72 is depressed downward and then to the left as viewed in FIG. 1 to the locked position. The platform 64 is then back down on deck 16 and the toy automobile rests upon the deck. From the above it is seen that the child may perform various tests and measurements upon the vehicle when it is in position on the diagnostic center. In addition to the above tests provision can be made for toy simulated dynomometer measurement, emission control test and other simulated automotive diagnostic operations.

Although the invention as been described in respect to a specific embodiment thereof it is understood that various modifications may be made within the spirit and scope of the invention as defined in the appended claim.

I claim:

1. A toy vehicle diagnostic center for performing simulated vehicle measurements and tests on a toy vehicle comprising:
   forwardly inclined downward deck means providing a diagnostic position for receiving toy vehicles to perform multiple measurements on the vehicles;
   inclined ramp means secured to the deck means whereby a toy vehicle may be manually directed to the deck means;
   retractable stop means located at the deck means having an extended position to maintain a toy vehicle in the said diagnostic position on the deck means and a retracted position to permit the toy vehicle to be rolled on to and off of the deck means;
   means to manually move the retractable stop means to the said extended and retracted positions;
   means located at the deck means to perform a plurality of measurements on a toy vehicle located in a fixed position on the deck means, which measurements simulate measurements that are performed on real vehicles in real diagnostic centers; and
   said means to perform a plurality of measurements including numerical indicia means to indicate the results of the said measurements.

2. A toy vehicle diagnostic center as set forth in claim 1 including further means to perform the plurality of measurements including further means to perform the plurality of measurements including length measuring means located on the deck means including:
   a pair of rod means;
   means to individually, manually extend said pair of rod means to the respective ends of a toy vehicle located on the deck means;
   said pair of rod means having indicia thereon to permit observation of the length of the toy vehicle.

3. A toy vehicle diagnostic center as set forth in claim 2 including a pair of rollers extending above the surface of the deck means to engage the front wheels of a toy vehicle located on the deck means in the said diagnostic position;
   manually operable means to rotate said pair of rollers whereby toy vehicle wheels in contact with the rollers are rotated;
   numerical counter means mounted adjacent said deck means; and
   mechanical linkage means connected to said numerical counter means and to said manually operable means whereby the number of rotations of the vehicle wheels is displayed by the numerical counter means.

4. A toy vehicle diagnostic center as set forth in claim 3 including vehicle height measuring means mounted adjacent said deck means;
   said height measuring means to pivot away from the said diagnostic position and to extend over the diagnostic position to measure the height of a toy vehicle;
   indicia means on said height measuring means whereby the height of a toy vehicle may be observed; and
   vehicle weighing means including platform means located on the deck means;
   spring means located below said platform means;
   means to lock the spring means in a non-weighing position;
   means connecting the platform means and the spring means to permit a toy vehicle located on the platform means to be weighed against the action of the spring;
   means to permit unlocking of the spring to permit vehicle weighing; and
   means responsive to the platform means to indicate the weight of the vehicle.

* * * * *